Jan. 9, 1951          C. E. GOSS          2,537,456
FISHING ROD SUPPORT
Filed June 25, 1946
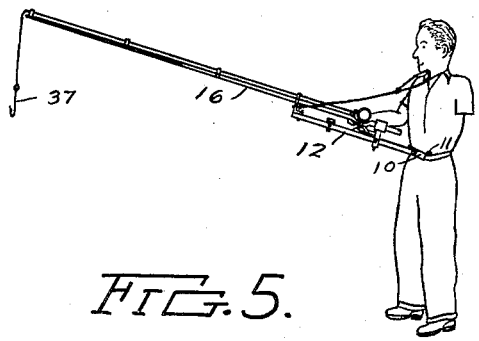
FIG. 5.
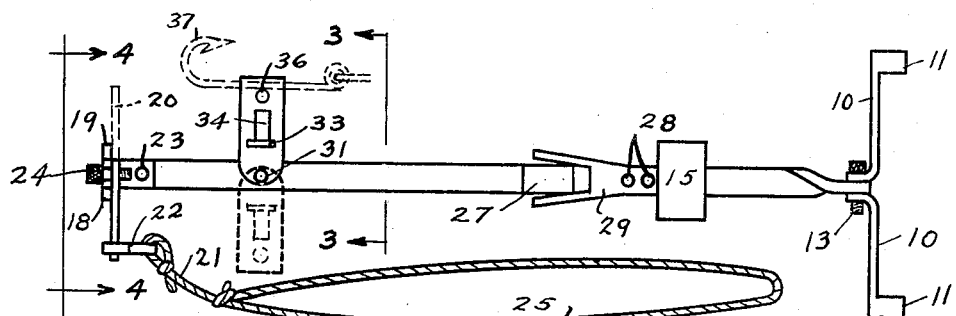
FIG. 1.
FIG. 2.
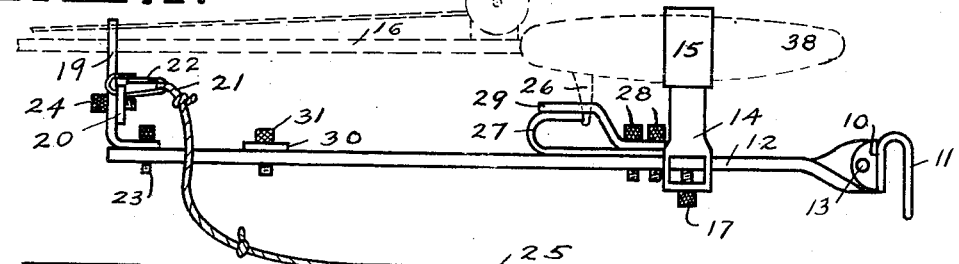
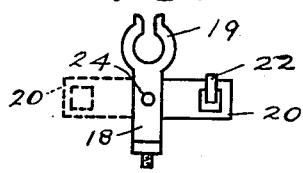
FIG. 3.
FIG. 4.
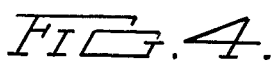
Inventor
CHARLES E. GOSS.
By Howard J. Whelan.
Attorney Patented Jan. 9, 1951

2,537,456

UNITED STATES PATENT OFFICE 2,537,456

FISHING ROD SUPPORT

Charles E. Goss, Baltimore, Md.

Application June 25, 1946, Serial No. 679,233

2 Claims. (Cl. 224—5)

This invention relates to the piscatorial art and more particularly to supports for fishing rods and their operational functioning to comply with special requirements of a user having physical characteristics that make it undesirable or impossible to use the rod in a conventional manner.

The usual manner of handling a fishing rod for fishing requires the use of both hands of the operator. It however happens that in some instances the fisherman has lost the use of an arm or hand and cannot use the fishing rod in the customary manner. No devices have been provided to meet such special situations. Several devices have been produced to hold the fishing pole to the side of a boat, or stuck into the ground when used by a person with two arms, but the particular forms employed have the disadvantage of being clumsy to operate and not adaptable for use by a one-armed person and eliminate some of the desirable features that make fishing an attractive pastime.

It is an object of this invention to provide a new and improved fishing rod support that will avoid one or more of the disadvantages and limitations of the prior art.

A further object of the present invention is to provide a new and improved fishing rod support that can be manipulated by a single hand of the user.

Another object of the herein described invention is to provide a new and improved fishing rod that will enable it to be operated by one hand of the operator, including the baiting of the hook and other details involved in the use of a fishing rod.

An additional object of the invention is to provide a new and improved fishing rod support that will be relatively compact, light in weight and effective in action.

For a better understanding of the invention and other objects thereof, reference is made to the appended drawings and the following description, both being taken together outlining a particular form of the invention by way of example, while reference is made to the claims for its general scope and spirit.

In the drawings:

Figure 1 is a plan view of a fishing rod support embodying this invention;

Figure 2 is a side view of Figure 1;

Figure 3 is a sectional detail of the hook holding clip used in this embodiment taken along line 3—3 of Figure 1;

Figure 4 is an end view looking in direction of arrows 4—4 shown in Figure 1, and Figure 5 indicates the general manner in which the fishing rod is held and operated by an individual.

Similar reference characters refer to similar parts throughout the drawings.

In the particular construction illustrated in Figure 1, belt clasp 10 having end hooks 11 serves to hold and fit on a belt or pants band of the user of the fishing rod support 12 on which the clasp 10 is held by the bolt 13. The support body 12 itself is about the length of an arm of an individual and is made of flat material and may be adjusted to several angles on the clasp by means of the adjustment of the bolt 13. A slidable yoke 14 extends above the body 12 and has a ring 15 provided in which the handle 38 of a fishing rod 16 can be inserted and held by friction. A set screw 17 permits the yoke to be moved along the body and tightened in a selected position thereon.

A holding clip 18 with resilient jaws 19 is of angular form and extends up above the body 12 at the end thereof and serves to support the middle of the fishing rod and act as a fulcrum therefor. This clip 18 has its axis aligned with that of the ring 15 and is made of an angle piece that raises it suitably above the level of the body 12. It is attached removably thereto by a bolt 23. Laterally connected to this clip arm 18 is a ring 20 which serves as a tie-in for a link 22 to which the cable end 21 is attached. This link is of the spring self-closing type that may be readily attached to the ring 20. This ring is held by the bolt 24 which permits placement of the said ring on either side of the clip 18, as indicated in Figures 1 and 4. The cable harness 25 is looped to allow it to be put over the head of the user and used as harness against the shoulders or neck for the suspension of the fishing rod. This is to take off a large portion of the weight from the hand of the operator during the manipulation of the fishing rod. In order to secure the handle of the rod in place in the yoke by means of the ring 15, a trigger catch is mounted on the support body 12 adjacent the yoke, and in front of it. This catch consists of a strip 27 of flat spring like material bent to contact the upper plate 29 resiliently and stay closed unless pressed forcibly apart. It is held in adjustable position on the body support 12 by bolts 28. The catch is cut so as to be bifurcated with the legs spread apart in tapered fashion to guide the trigger 26 on the handle of the fishing rod into position and be held thereby. A hook holding plate 30 is attached to the support 12 by screw 31, the under slidable plate 32 is attached thereto by a tongue 33 which slides in a slot 34 positioned longitudinally in said hook holding plate 30. The under plate is provided with a threaded hole to allow the adjustment screw 36 to tighten the plates on the fishing hook 37 and hold same while the one armed fisherman is baiting the hook.

The operation of the device is made clear by reference to Figure 5. The first operation is to secure the hooks 11 in the belt or top of the pants band, the harness cable 25 is positioned over the head and adjusted to give the support at the angle desired by the fisherman. The line with the baited hook is then casted into the stream, the tapered handle 38 is entered into the ring 15 and forced back into the ring until frictionally tight, this operation causes the trigger 26 forming part of the handle to enter the bifurcated legs forcing the strip 27 downwardly from the upper plate 27 until the trigger is in position, the strip 27 will then move upward and through the upper plate and prevent the fishing rod to be pulled out of the support by any fish that may be caught on the line and hook due to the engagement of trigger 26 with the holding plates 27 and 29. When a fish has been caught or it is desired to remove the fishing rod from the support the fisherman presses down on the strip 27 and pulls the rod out of the ring 15. The ring 20 and the hook holding plate may be shifted to either side of the support to suit the user and depending on which arm may be missing.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention; what is claimed is:

1. A holder for a fishing rod having a handle and a trigger thereon, comprising a support, a belt clasp secured to said support for attachment to the belt of a fisherman, a yoke for holding the handle, a holding clip on said support for the fishing rod at a point spaced from said yoke, a harness attached to said support for suspending the end portion of the same so that the weight of the rod thereon is transmitted to the belt and through the harness to the neck or shoulders of the user, means for positively holding the trigger immovable on said support to maintain the handle in place thereon, said means for positively holding the trigger immovable consisting of a bifurcated clip to receive the trigger, and a spring element acting against said clip to bias the latter against the trigger.

2. A holder for a fishing rod having a handle and a trigger thereon, comprising a support, a belt clasp secured to said support for attachment to the belt of a fisherman, a yoke for holding the handle, mounting means for adjustably securing said yoke on said support, a holding clip on said support for the fishing rod at a point spaced from said yoke, a harness, means for adjustably mounting said harness on said clip in selective positions, means for positively securing the trigger on said support to maintain the handle in rigid position, said means for securing the trigger consisting of a bifurcated clip to receive the trigger, and a spring element acting against said clip to bias the latter against the trigger.

CHARLES E. GOSS.

REFERENCES CITED

The following references are of record in the file of this patent:

UNITED STATES PATENTS

| Number | Name | Date |
| --- | --- | --- |
| 817,207 | Wheeler | Apr. 10, 1906 |
| 1,198,202 | Drinkard | Sept. 12, 1916 |
| 2,101,174 | Grahame | Dec. 7, 1937 |
| 2,137,645 | Doench | Nov. 22, 1938 |
| 2,236,070 | Rohrdanz | Mar. 25, 1941 |